Jan. 30, 1951  R. ERICSSON  2,539,949
CASH REGISTER
Filed April 22, 1949  4 Sheets-Sheet 1
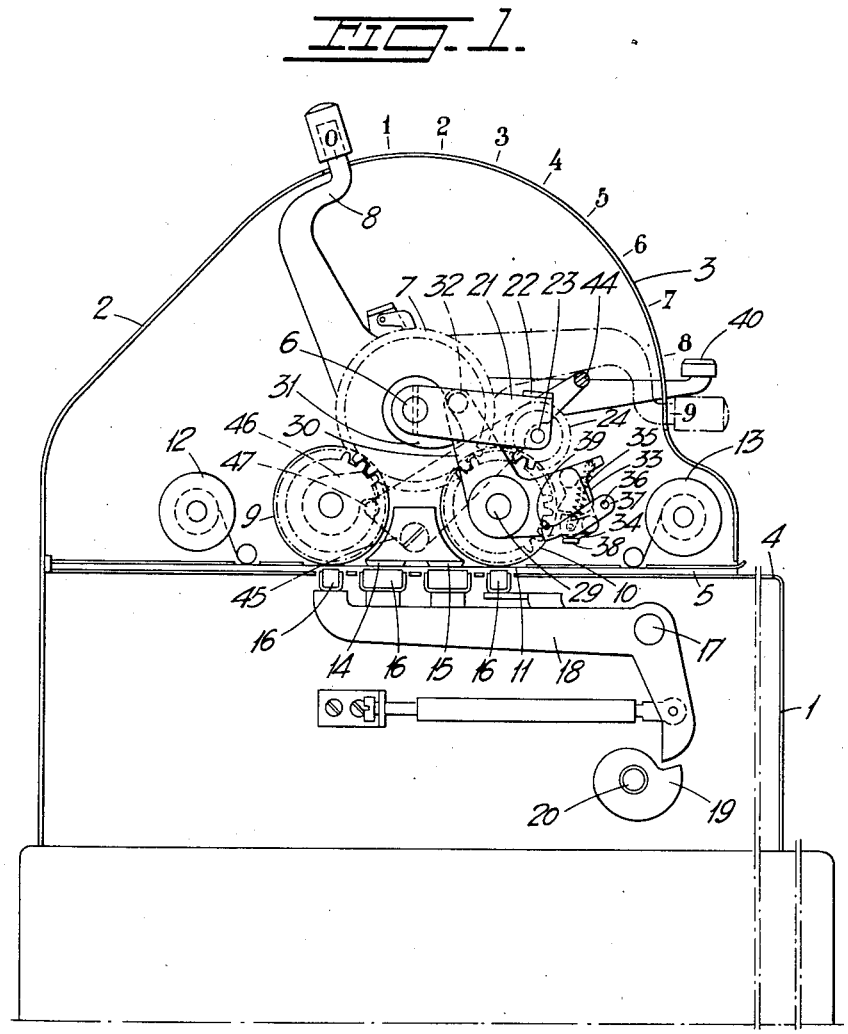
Inventor
Ruben Ericsson
by Sommers & Young
Attorneys Jan. 30, 1951   R. ERICSSON   2,539,949
CASH REGISTER
Filed April 22, 1949   4 Sheets-Sheet 2
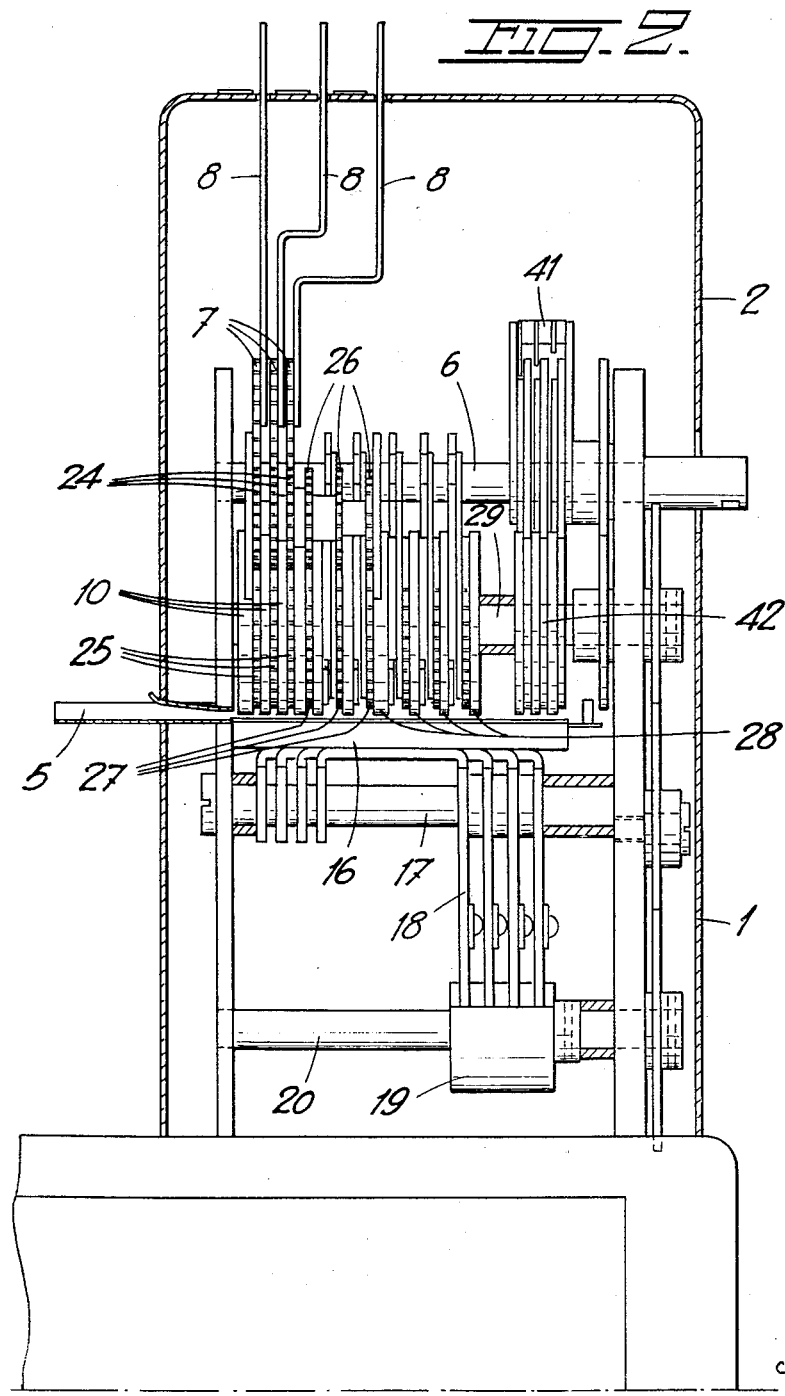
Inventor
Ruben Ericsson
by Sommers & Young
Attorneys Jan. 30, 1951  R. ERICSSON  2,539,949
CASH REGISTER
Filed April 22, 1949  4 Sheets-Sheet 3
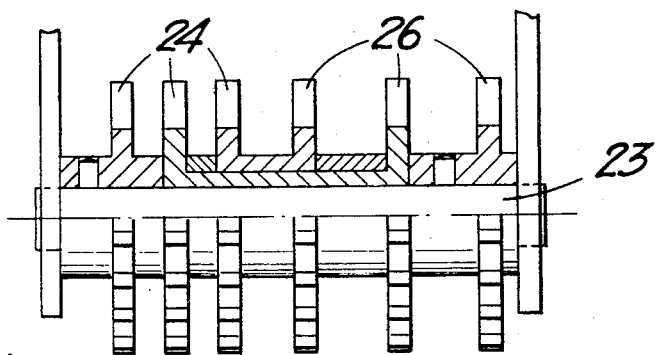
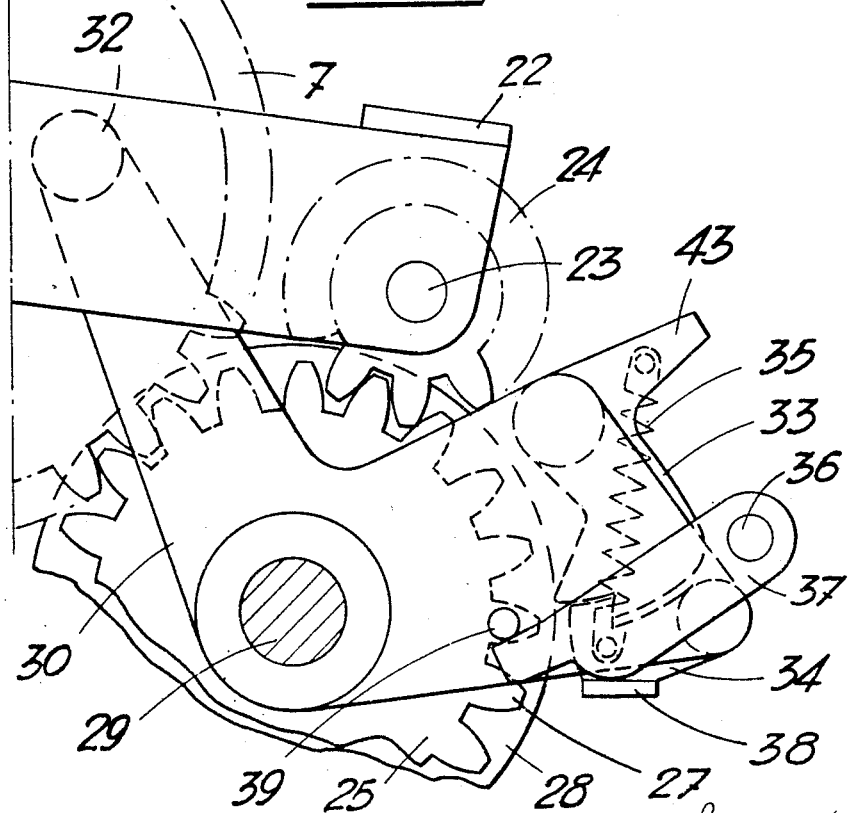
Inventor
Ruben Ericsson
by Sommers+Young
Attorneys Jan. 30, 1951  R. ERICSSON  2,539,949
CASH REGISTER
Filed April 22, 1949  4 Sheets-Sheet 4
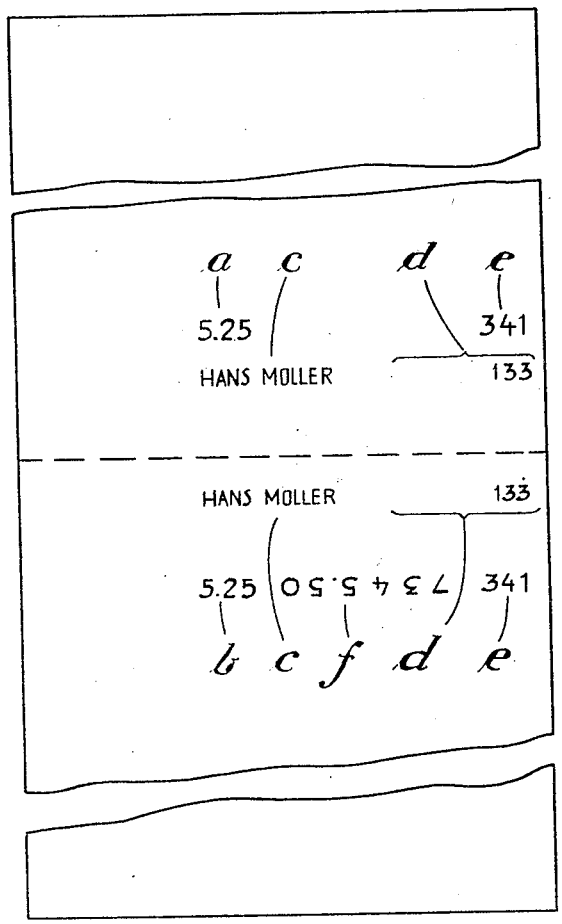

Patented Jan. 30, 1951

2,539,949

UNITED STATES PATENT OFFICE 2,539,949

CASH REGISTER

Ruben Ericsson, Stockholm, Sweden

Application April 22, 1949, Serial No. 89,005
In Sweden October 10, 1946

3 Claims. (Cl. 235—3)

The present invention relates to cash registers, and more particularly to cash registers of the type having setting wheels shaped as type wheels by means of which the amounts set up may be printed on a receipt or record slip.

As well-known cash registers are generally based on the principle that a registration of the amounts received is effected in a totalizer inaccessible to the operator the setting of which representing the amounts registered may be controlled by a special reading operation. In case of many of the types of cash registers available in the market, and more particularly cash registers of earlier types, visual reading is used. In order that the proprietor of a shop in which such a cash register is installed may obtain an exact report of the amounts paid he is, therefore, obliged to read the totalizer personally and make a corresponding note. Where such a reading method is not always practicable, the proprietor is more or less reduced to the necessity of relying on the statements of a representative, such as the business manager. It is evident that under such circumstances no real control can be obtained.

In modern types of cash registers it is possible, however, by the aid of a special reading operation to obtain the total of, say, a day's, a week's or a month's turnover printed on a receipt, a record slip or the like. Cash registers of such type, however, are quite out of the question for a lot of purposes because of the high costs for procuring them.

The present invention has for its object to provide a cash register which continuously prints on receipts or record slips the total of the amounts registered and which is simple in construction and inexpensive in manufacture, so that it may be procured for purposes for which the bigger and more expensive machines are out of the question, as for instance, at places where football-pools coupons are delivered and paid.

According to a principal feature of the invention the cash register is provided with an adding totalizer including type wheels which each time an amount set up is printed on a receipt or record slip, simultaneously prints on the same receipt or slip the total of the amounts previously set up in the machine. The proprietor of such a machine may thus, whenever desired, obtain an exact statement of the total of amounts registered during a given period by adding the amount last printed on the receipt or record slip to the sum printed on the same receipt or slip.

In order to render the structure of the machine as simple as possible, the return stroke of the type wheels following each registration of an individual amount is utilized according to the invention for transferring the amount set up and printed to an adding totalizer for printing the sum. By this means the rotation of the type wheels of said adding totalizer will take place in the opposite direction to the rotation of the type wheels for printing the individual amounts and, as a result, the sum will be printed in an upside down position with relation to the imprints of the individual amounts. By this means the imprint of the sum will be completely separated from the remaining imprints on the receipt or slip, thereby avoiding any risk of confusion.

In the accompanying drawings the main elements of a cash register embodying the invention are illustrated. Fig. 1 is a longitudinal section of the machine, Fig. 2 is a cross section thereof; Fig. 3 is a detail view of the transfer gearing of the machine; Fig. 4 shows an example of a receipt or record slip printed in the machine, and Fig. 5 is a detail view of the tens transfer mechanism.

The apparatus shown in the drawings is enclosed in a casing comprising a lower member 1 having a plane top surface and an upper member 2 having a curved, that is, convex front wall 3. The lower member 1 of the casing contains the printing mechanism, while the upper member 2 of the casing contains the type wheels and associated setting means. The top surface 4 of the lower casing member acts as a table for supporting a receipt or record to be introduced into a horizontal guide way 5 provided between the lower and upper casing members.

A transversely extending shaft 6, hereinafter referred to as the main shaft of the machine, which is provided in the upper member of the casing, supports a set of toothed wheels 7 rotatably mounted on the shaft each of which may be controlled by an individual control lever 8. The levers 8 project through slots formed in the front wall 3 of the upper casing member. It is to be noted that said front wall 3 is concentric with the main shaft 6. The front wall 3 is provided with indications 0–9 representing the various positions into which the control levers may be set. Each toothed wheel 7 is in mesh with toothed rims of two type wheels 9 and 10 located right above openings formed in the top wall of the guide way 5 which extend through said openings down to the level of an ink ribbon 11 passing through said guide way 5 while being unrolled from and collected on drums indicated at 12 and 13, respectively, Fig. 1. Provided between said type wheels 9 and 10 are stationary type carriers or printing blocks 14 and 15 for printing a control number or some other text. Said stationary type carriers are likewise situated above openings in the top wall of guide way 5 and extend down into touch with the ink ribbon. Through corresponding openings formed in the bottom wall 4 of the guide way 5 preferably elastic printing hammers 16 may be forced upwards against the type wheels and the stationary type carriers when a printing operation is to take place. Said hammers 16 are supported by an arm of a bell crank lever 18 mounted on a shaft 17 in the lower casing member, the other arm of which is controlled by a cam 19 on a shaft 20 driven from the main shaft 6 of the machine through any appropriate transmission elements.

Rotatably mounted on the main shaft 6 is a strap comprising a pair of side members or arms 21 radially projecting from shaft 6 and a bar 22 carried by said arms which extends parallel with the main shaft 6. Rigidly connected to said side members or arms 21 is, furthermore, a shaft 23 parallel with the main shaft 6 which supports a gearing for coupling the type wheels 10 to corresponding wheels of an adding totalizer. To this end said gearing comprises, as shown in Fig. 5, a set of toothed wheels 24 each of which is in mesh with a toothed rim 25 of a corresponding type wheel 10, and a corresponding set of toothed wheels 26 in mesh with toothed rims 27 each belonging to an individual type wheel 28 of an adding totalizer mounted on the shaft 29 supporting the type wheels 10 or on another shaft situated in alinement with shaft 29.

The transfer gearing above referred to is shown in detail in Fig. 3, partly in elevation and partly in axial section. As will appear from Fig. 3, the extreme right hand toothed wheel 24, which corresponds to the units wheel of the setting wheels mechanism, is rigidly connected to the extreme left hand toothed wheel 26 corresponding to the unit wheel of the adding totalizer. Similarly, the intermediate wheel 24 corresponding to the tens wheel of the setting wheels mechanism is rigidly connected to the intermediate wheel 26 which corresponds to the tens wheel of the adding totalizer. In an analogous manner the extreme left hand wheel 24 which corresponds to the hundreds wheel of the setting wheels mechanism is rigidly connected to the extreme right hand wheel 26 corresponding to the hundreds wheel of the adding totalizer. It is thus seen that the wheels of the adding totalizer are arranged in the reverse order to the setting wheels in the axial direction. Due to the fact that the wheels of the adding totalizer, as hereinafter described, are rotated on the return stroke of the setting wheels, the rotation will also take place in the opposite direction to the rotation of the setting wheels and, consequently, the types of the type wheels of the adding totalizer must be arranged for printing the sums upside down with relation to the imprints of the individual amounts.

The tens transfer mechanism belonging to the adding totalizer is shown as to its main features in Fig. 1 and on a larger scale in Fig. 5. It comprises a bell crank lever 30 mounted on the shaft of the adding wheels which in the example shown is assumed to be identical with shaft 29 of the type wheels 10. Said bell crank lever bears with one end against a cam 31 on the main shaft 6 through the intermediary of a roller 32 and supports at its other end a feeding pawl 33 and a detent 34. A spring 35 interconnects said pawl and said detent and maintains them normally in a position with relation to each other in which the feeding pawl is held out of engagement with the toothed rim of the respective adding wheel due to the engagement of the detent in a notch of the pawl. Rotatably mounted on a non-rotatable shaft 36 provided outside said pawl and detent is a releasing lever 37. Said lever 37 bears with its edge against a lateral projection 38 of the detent, so that it will be under the indirect influence of spring 35. The free end of said releasing lever 37 projects into the path of a releasing pin 39 or, in case of adding wheels having double decades, in the path of two diametrically opposite releasing pins provided on the respective adding wheels.

In addition to the main elements above described the machine also includes a starting key 40 which normally maintains the main shaft 6 locked against rotation, a totalizer 41 controlled from the main shaft 6, and type wheels controlled by the wheels of said totalizer which are provided on the shafts of the type wheels 9 and 10.

The operation of the machine described is as follows:

The setting of an amount is effected by moving one or more of the hand levers 8 to the positions corresponding to the amount to be set. By this operation the respective toothed wheels 7 are rotated a corresponding number of steps and rotate in their turn the type wheels 9 and 10 to set them into positions for printing the amount on a record slip inserted in the guide way 5. After the setting is completed the starting key 40 should be depressed to release the main shaft 6, which is thereby allowed to perform a revolution before again checked by the starting key. The rotation is assumed in the example shown to be effected by means of a manually controlled crank but may, of course, also be effected by a motor, preferably controlled by the starting key. The rotation of the main shaft effects, primarily, operation of the printing hammers supporting lever 18, causing it to produce an imprint on the record slip by means of its entire set of types and printing blocks.

Fig. 4 illustrates an example of the imprints thus made on a record slip. At $a$ the amount set (as 5.25) is printed by the type wheels 9 and at $b$ the same amount is printed by the type wheels 10; at $c$ a text is printed by the printing blocks 14 and 15, viz. in the example shown the name of the proprietor of the cash register, at $d$ the number of the proprietor of the machine is printed, and at $e$ the current number of the record slip is printed by means of the type wheels 42 of the totalizer 41. Finally, at $f$ the total of previously registered amounts (that is to say, exclusive of the amount 5.25) is printed by means of the type wheels 28 of the adding totalizer. This is due to the fact that the transfer of an amount set up is effected only during the restoration of the control levers 8 and the type wheels 9 and 10 to their normal positions after the completion of a printing operation.

While the printing operation was taking place, the transfer wheels 24, 26 were moved into their operative positions. During the continued rotation of the main shaft 6 the control levers 8 are restored to their normal positions by the action of a rod 44 attached to one end of a bell crank lever 45 the other end of which is controlled by a cam 46 on the shaft of the type wheels 9 through the intermediary of a roller 47. In this operation the type wheels 9 and 10 are rotated oppositely to their rotation at the setting operation, and to the wheels of the adding totalizer a rotation in the same direction is imparted through the gearing 24, 26. It is thus seen that the setting of the type wheels of the adding totalizer takes place in the opposite direction to the setting of the amount type wheels 9 and 10. The total printed by the type wheels at the next working cycle will thus be printed upside down on the slip with relation to the amount digits. As a result, the total will appear distinctly separated from the remaining digits of the slip, as shown in Fig. 4. In order to obtain the real total, it is only required to add the amount printed at $a$ and $b$ to the sum printed at $f$.

The tens transfer mechanism of the adding totalizer operates as follows:

As soon as a pin 39 strikes the releasing lever 37 and moves same while passing beyond the free end thereof, the releasing lever is caused to release the detent 34 from its engagement with the feeding pawl 33. The released feeding pawl moves by the action of its weight and/or by the action of a spring into engagement with the toothed rim of the respective type wheel 28 and feeds same, as the bell crank lever 30 moves under the action of the tens transfer cam 31 of the main shaft 6. Near the end of the movement of the bell crank lever 30 under the influence of said cam 31 a rear projection 43 of the feeding pawl strikes the non-rotatable shaft 36 of the releasing lever 37, thereby bringing the feeding pawl out of engagement with the toothed rim of the respective type wheel 28 during the last stage of the movement of the bell crank lever, to be then again caught by the detent 34. It is thus seen that when the main shaft 6 has completed its revolution, the tens transfer mechanism is again in its normal position.

The cash register above described allows an inspector whenever desired and without the aid of any mechanical reading operation to obtain a printed, exact statement of the sum of the amounts set up in the machine. Manipulations in order to obtain false reading statements are thus eliminated.

What I claim is:

1. In a cash register, a setting wheel mechanism including type wheels by means of which the individual amounts set up may be printed on a record slip, an adding totalizer including type wheels for printing on the same record slip concurrently with the printing of an individual amount the total of the amounts previously set up in the machine, a main shaft and associated means for controlling said printing operations, a gearing under the positive control of the main shaft for connecting the setting wheels mechanism to the adding totalizer during the performance of a printing operation and for effecting a transfer of the individual amount set and printed to the adding totalizer during the return stroke of the setting wheels mechanism.

2. In a cash register, a setting wheels mechanism including type wheels by means of which the individual amounts set up may be printed on a record slip, an adding totalizer including type wheels for printing on the same record slip concurrently with the printing of an individual amount the total of the amounts previously set up in the machine, a main shaft and associated means for controlling said printing operations, a gearing under the positive control of the main shaft for connecting the setting wheels mechanism to the adding totalizer during the performance of a printing operation and for effecting a transfer of the individual amount set and printed to the adding totalizer during the return stroke of the setting wheels mechanism subsequent to the performance of the respective printing operation, the type wheels of the adding totalizer being arranged in the reverse order to that of the type wheels of the setting wheels mechanism in order to allow the type wheels of the adding totalizer to rotate in the opposite direction to the rotation of the setting wheels for printing the totals in an upside down position with relation to the imprints of the individual amounts.

3. In a cash register, a setting wheels mechanism including type wheels by means of which the individual amounts set up may be printed on a record slip, an adding totalizer including type wheels for printing on the same record slip concurrently with the printing of an individual amount the total of the amounts previously set up in the machine, a common shaft for supporting the type wheels of the setting wheels mechanism and the type wheels of the adding totalizer, a gearing for connecting during the printing operation the setting wheel mechanism to said adding totalizer and transferring the amount just set and printed to the adding totalizer during the return stroke of the setting wheels mechanism, said gearing comprising a set of toothed wheels connected in pairs, a shaft parallel with said first-mentioned shaft for supporting said toothed wheels, and a carrier for said parallel shaft mounted to rock about the main shaft of the machine.

RUBEN ERICSSON.

REFERENCES CITED

The following references are of record in the file of this patent:

UNITED STATES PATENTS

| Number | Name | Date |
| --- | --- | --- |
| 1,039,614 | Trinks | Sept. 24, 1912 |
| 1,853,050 | Horton | Apr. 12, 1932 |
| 1,931,984 | Hanel | Oct. 24, 1933 |
| 2,012,330 | Widmaier | Aug. 27, 1935 |
| 2,044,975 | Evans | June 23, 1936 |
| 2,052,821 | Goodwillie | Sept. 1, 1936 |
| 2,174,571 | Eller | Oct. 3, 1939 |
| 2,473,509 | Demeulenaere | June 21, 1949 |